United States Patent
Kniazyszcze et al.

(10) Patent No.: US 7,611,115 B2
(45) Date of Patent: Nov. 3, 2009

(54) CUP HOLDER ASSEMBLY

(75) Inventors: Bernard R. Kniazyszcze, Romeo, MI (US); Kurt L. Broman, Shelby Township, MI (US); Jim Y. Chyou, Utica, MI (US); Robert A. Zayler, Lake Orion, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/044,259

(22) Filed: Mar. 7, 2008

(65) Prior Publication Data
US 2009/0224124 A1 Sep. 10, 2009

(51) Int. Cl.
*A47K 1/08* (2006.01)
(52) U.S. Cl. .................... 248/311.2; 224/926
(58) Field of Classification Search .............. 248/311.2, 248/314; 224/926, 282, 542; 296/37.15
See application file for complete search history.

(56) References Cited

U.S. PATENT DOCUMENTS 5,680,974 A * 10/1997 Vander Sluis ............... 224/281
2004/0079850 A1 * 4/2004 Takahashi ................ 248/311.2
2005/0035254 A1 * 2/2005 Moyer et al. ............. 248/311.2
2005/0139741 A1 * 6/2005 Yuen ....................... 248/311.2

* cited by examiner

*Primary Examiner*—Ramon O Ramirez
(74) *Attorney, Agent, or Firm*—Quinn Law Group, PLLC.

(57) ABSTRACT

A cup holder assembly is provided, including a bin having at least one vertical wall with a floor extending from one end thereof. A bale having a flat surface opposing a contoured surface is attached to the bin to pivot between a first position, in which the flat surface is parallel to and distal from the bin floor, and a second position, in which the contoured surface is perpendicular to the floor. A cup retention feature is spaced from the bale and attached to the bin to pivot between a use position, for securely retaining a container, and a stowed position, in which the cup retention feature is positioned between the bale and bin wall. A linkage is connected to the bale and cup retention feature to selectively simultaneously move the bale between the first and second positions and the cup retention feature between the use and stowed positions.

19 Claims, 3 Drawing Sheets

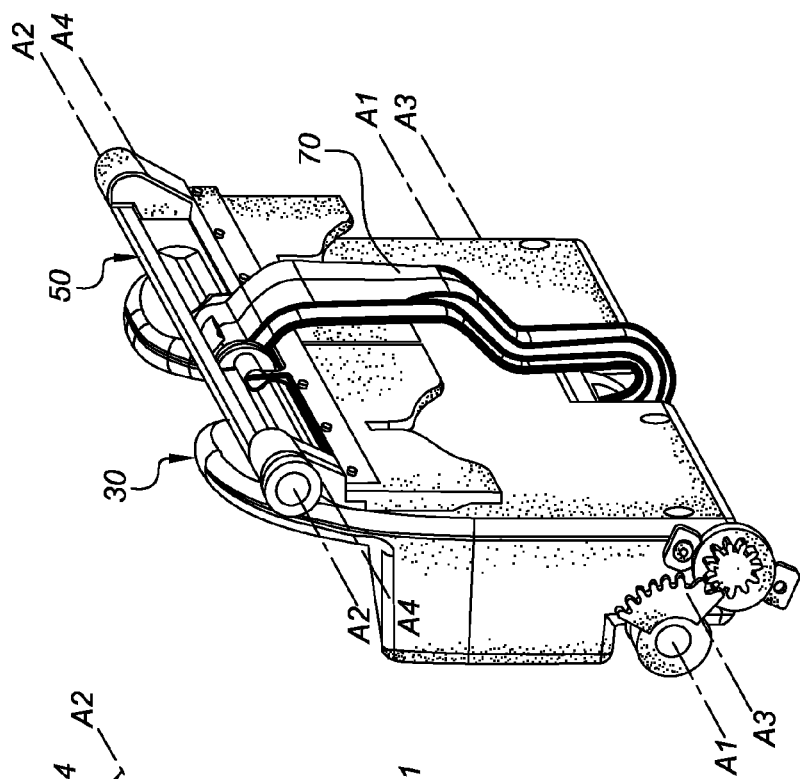
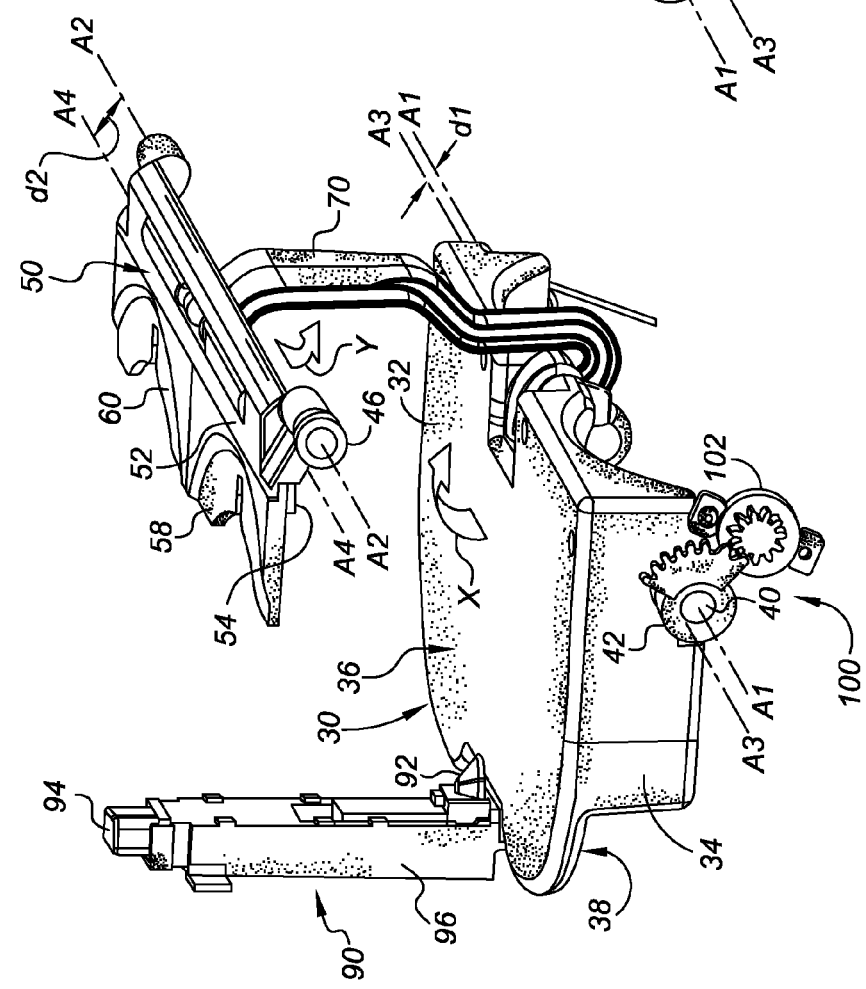
FIG. 2A
FIG. 2B

CUP HOLDER ASSEMBLY

TECHNICAL FIELD

The present invention relates generally to cup holders, and more specifically to cup holder assemblies for securely retaining containers of varying sizes inside of a vehicle passenger compartment.

BACKGROUND OF THE INVENTION

Most current production automotive vehicles incorporate a cup holder into the vehicle passenger compartment. The cup holder is generally intended to provide a stable receptacle for securing a container, such as a beverage can or cup, during vehicle operation, particularly for the vehicle driver who requires the use of both hands. Cup holder assemblies have taken various forms, such as recessed receptacles formed in the instrument panel or center console, and similarly located trays provided with cup receiving apertures. Other types of cup holders are designed to transition from a stored position to an extended position, allowing the cup holder to be moved out of the way when not in use.

Space constraints and consumer preferences typically drive the offering and location of cup holder assemblies in automotive vehicles. Cup holders are often provided in vehicles for both front and rear passengers, mounted in such diverse locations as adjacent the dash board, the vehicle doors, and the floor board, and upon the passenger seats. In addition, many cup holder assemblies are designed to receive and retain containers of varying sizes. For example, some cup holder assemblies include flexible tabs on an interior surface of a container body to support a smaller diameter container therein. Another approach is to use spring loaded, semi-circular arms that are adjustable to grip containers of varying diameters.

SUMMARY OF THE INVENTION

According to one embodiment of the present invention, a cup holder assembly is provided, including a bin member, a bale member, a cup retention feature, and an actuation member. The bin member has at least one generally vertical wall portion with a floor portion extending from a first end thereof. The bale member has first and second opposing surfaces, and is movable between a first position, in which the first surface is generally parallel to the bin floor portion, and a second position in which the second surface is generally perpendicular to the bin floor portion. The cup retention feature is spaced from the bale portion, and is movable between a use position, in which the cup retention feature is configured to engage a container, such as a beverage can or cup, and a stowed position. The actuation member is configured to substantially simultaneously move the bale member between the first and second positions and the cup retention feature between the use and stowed positions. Ideally, the bin portion is characterized by a first depth when the bale member is in the first position, and a second depth when the bale member is in the second position.

According to one aspect of the present embodiment, the actuation member includes a linkage member operatively connected to the bale member and the cup retention feature. Moreover, the actuation member preferably also includes a first biasing member operatively engaged with the bale member to bias the same from the first position to the second position, and thus the cup retention feature from the use position to the stowed position via the connection through the linkage member.

In another aspect of the present embodiment, it is desirable that the bale member be connected to the bin member to rotate about a first axis, and the cup retention feature be connected to the bin member to rotate about a second axis. In addition, a first end of the linkage member engages the bale member along a third axis that is offset a first distance from the first axis. Similarly, a second end of the linkage member engages the cup retention feature along a fourth axis that is offset a second distance from the second axis. Ideally, the first offset distance is greater than the second offset distance, creating an angular rotation ratio that allows the cup retention feature to rotate faster between respective positions than the bale member.

In a further aspect of the present embodiment, the bale member defines an arcuate channel with first and second interface portions at opposing ends thereof. In this particular instance, the first end of the linkage member is slidably disposed within the arcuate channel such that the cup retention feature moves between the use and stowed positions when the first end abuts against the first interface portion. A second biasing member is preferably engaged with the first end of the linkage member, biasing the first end into engagement with the first interface portion of the arcuate channel. The first biasing member has a first spring force constant, and the second biasing member has a second spring force constant that is less than the first spring force constant. The second biasing member is intended to ensure that the cup retention feature can reach its stowed position without the bale feature rotating to a point where it might interfere with the cup retention feature. The second biasing member also helps prevent the linkage member from generating excessive rattling noise.

According to yet another aspect of the present embodiment, a latch member is operable to selectively engage, and thereby at least partially retain the bale member in the first position. As such, the first biasing member urges the bale member from the first position to the second position when the latch member is disengaged therefrom.

In accordance with yet another aspect of the present embodiment, a gear member is disposed concentrically with the first biasing member. A motion damper is engaged with the gear member such that pivoting the bale member via the first biasing member from the first position to the second position is dampened by the motion damper.

According to another embodiment of the present invention, a dual-depth cup holder assembly is disclosed. The dual-depth cup holder assembly includes a bin member having at least one generally vertical wall portion with a floor portion extending generally perpendicularly from a first end thereof. A bale member having a substantially flat surface opposing a contoured surface is pivotable with respect to the bin member between a first position, in which the substantially flat surface is generally parallel to and distal from the bin floor portion, and a second position, in which the contoured surface is generally perpendicular to the bin floor portion. In addition, a cup retention feature is vertically spaced from the bale member along the wall portion, and pivotable with respect to the bin member between a use position, in which the cup retention feature is configured to engage with and thereby retain a container, and a stowed position, in which the cup retention feature is positioned between the bale member and the wall portion. A linkage member connects the bale member and the cup retention feature such that pivoting of the bale member between the first and second positions substantially simultaneously pivots the cup retention feature between the use and stowed positions. The bin portion is thus characterized by a first depth when the bale member is in the first position and a second depth when the bale member is in the second position.

In one aspect of the present embodiment, it is desirable that the bale member be connected to the bin member to rotate about a first axis, and the cup retention feature be connected to the bin member to rotate about a second axis. In addition, a first end of the linkage member engages the bale member along a third axis that is offset a first distance from the first axis. Similarly, a second end of the linkage member engages the cup retention feature along a fourth axis that is offset a second distance from the second axis. Ideally, the first offset distance is greater than the second offset distance, creating an angular rotation ratio that allows the cup retention feature to rotate faster between respective positions than the bale member.

According to another aspect of the present embodiment, a first spring member engages with the bale member to bias the same from the first position to the second position and, via the linkage member, bias the cup retention feature from the use position to the stowed position.

In accordance with another aspect, the bale member defines an arcuate channel with first and second interface portions at opposing ends thereof. To this regard, the first end of the linkage member has one or more protrusions slidably disposed within the arcuate channel such that the cup retention feature is moved between the use and stowed positions when the protrusions abut against the first interface portion. A second spring member is preferably engaged with the first end of the linkage member to bias the same into engagement with the first interface portion of the arcuate channel. Ideally, the first spring member has a first spring force constant, and the second spring member has a second spring force constant that is less than the first spring force constant.

The above features and advantages, and other features and advantages of the present invention, will be readily apparent from the following detailed description of the preferred embodiments and best modes for carrying out the present invention when taken in connection with the accompanying drawings and appended claims.

BRIEF DESCRIPTION OF THE DRAWINGS

FIG. 2A is an alternative perspective view illustration of the cup holder assembly of FIG. 1 with the bin member removed to illustrate the bale member and cup retention feature in respective first positions;

FIG. 2B is an alternative perspective view illustration of the cup holder assembly of FIG. 1 with the bin member removed to illustrate the bale member and cup retention feature in respective second positions;

DESCRIPTION OF THE PREFERRED EMBODIMENTS

Figure 1:
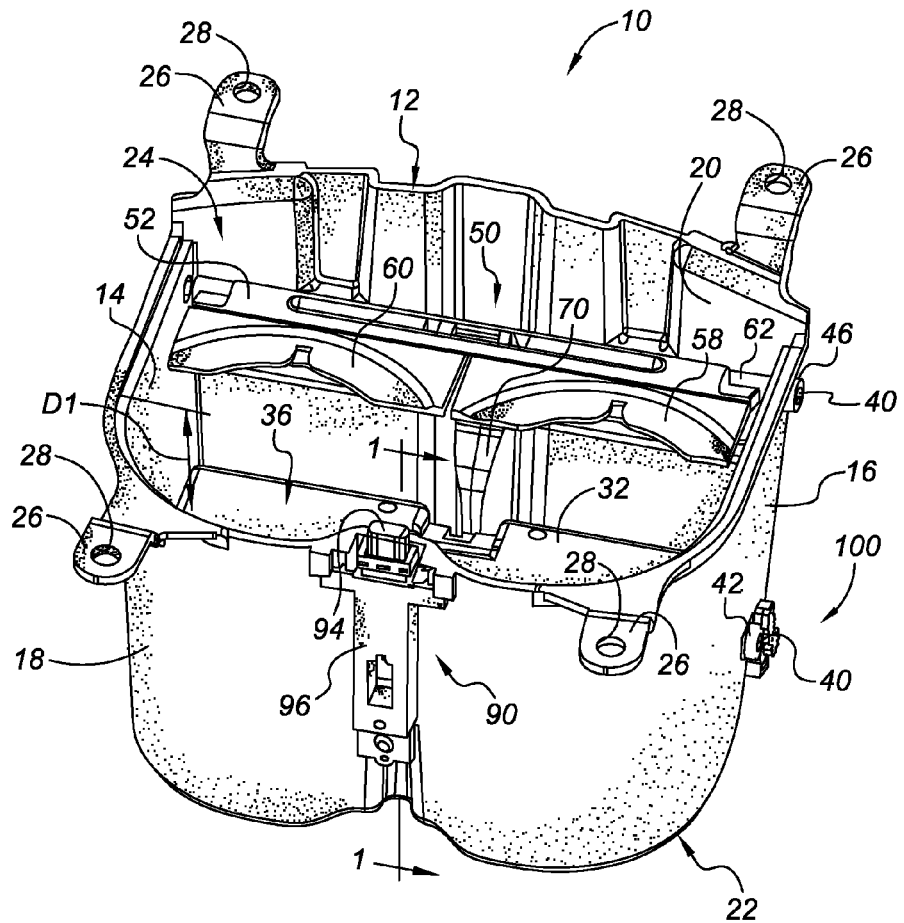
FIG. 1 is a perspective view illustration of a cup holder assembly in accordance with a preferred embodiment of the present invention.

Referring to the drawings, wherein like reference numbers refer to like components throughout the several views, a cup holder assembly, identified generally as 10, is shown in FIG. 1 in accordance with a preferred embodiment of the present invention. The cup holder assembly 10 is intended for integration into a passenger compartment of an automobile (not shown), to provide a stable receptacle for securing containers of various sizes, such as a beverage can or cup, during vehicle operation. However, it should be recognized that the present invention may be integrated into various other applications, moving (e.g., buses, trains, airplanes, etc.) and nonmoving (e.g., movies theatre seats, home furniture, etc.) alike, to securely retain an infinite variety of containers. In addition, the drawings presented herein—i.e., FIGS. 1 through 4B, are not to scale and are provided purely for instructional purposes. Thus, the specific and relative dimensions shown in the drawings are not to be considered limiting.

Figure 4A:
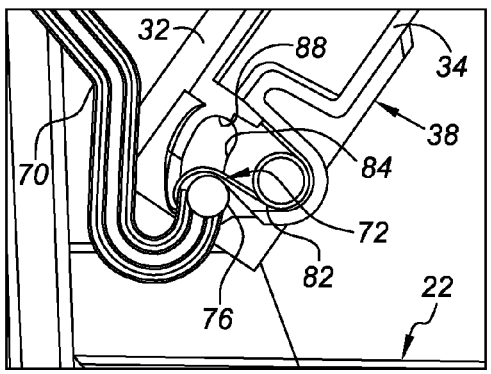
FIG. 4A is a side cross-sectional view taken along line 1-1 of FIG. 1, illustrating the bale member in transition between the first and second positions.
Figure 4B:
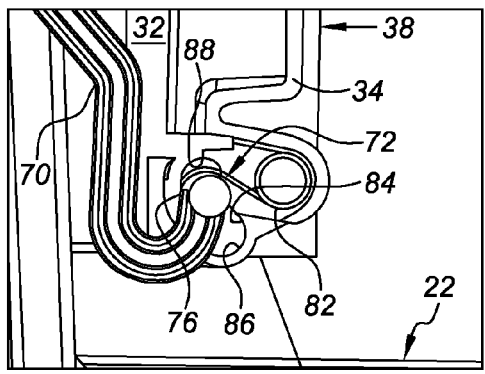
FIG. 4B is a side cross-sectional view taken along line 1-1 of FIG. 1, illustrating the bale member in the second position.

The cup holder assembly 10 includes a bin member 12, which may also be referred to herein as a housing or main receptacle. The fundamental portions of the bin member 10 include at least one wall portion, presented in FIG. 1 as opposing first and second side walls 14 and 16, respectively, and opposing front and rear walls 18 and 20, respectively, with a floor portion 22 (which is best seen in FIGS. 4A and 4B) extending generally perpendicularly from lower ends of the various bin wall portions. The wall portions 14, 16, 18, 20 are cooperatively configured to form a receptacle opening 24. Ideally, the bin member 12 is a preformed, single-piece component fabricated from a light-weight and resilient material sufficient for the intended use of the cup holder assembly 10, such as, but not limited to, polyurethane, polyvinyl chloride, and polyethylene.

According to the embodiment illustrated in FIG. 1, the bin member 12 also includes structure configured for attaching the cup holder assembly 10 to a foreign structure (such as a vehicle center console or armrest assembly), defined herein, but not intentionally limited to, a plurality of stepped attachment flanges 26 extending outward from upper peripheral edges of the front and rear walls 18, 20. Each of the attachment flanges 26 defines an aperture 28 therethrough that is configured to receive, for example, a respective fastener, bolt, or screw.

Figure 3:
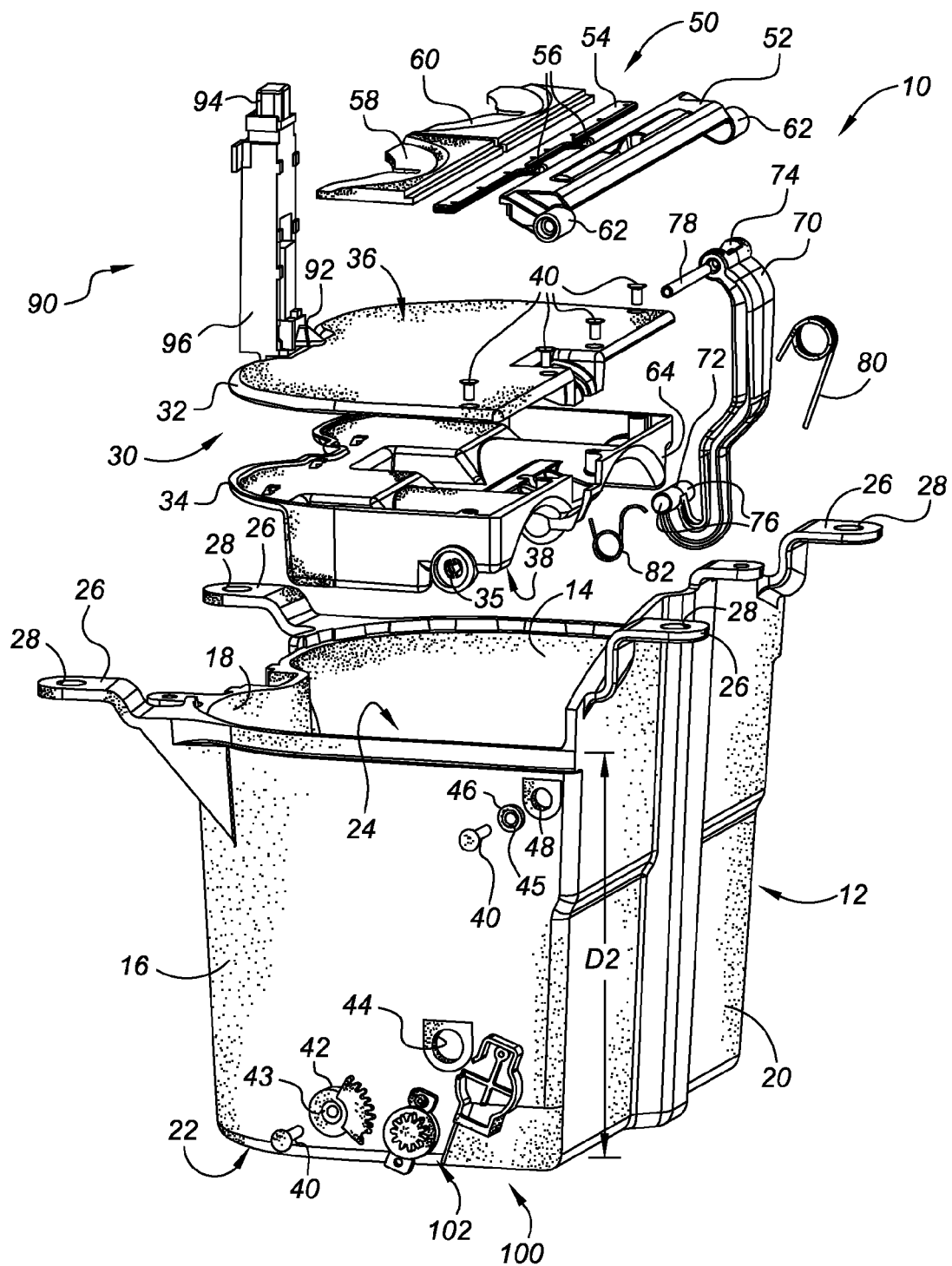
FIG. 3 is an exploded view of the cup holder assembly of FIG. 1.

The cup holder assembly 10, as shown in FIGS. 2A and 2B, also includes a bale member 30 having an upper bale portion 32 designed to engage, mate with, and attach to a lower bale portion 34 (e.g., via screws 40 of FIG. 3). The upper bale portion 32 has a first, substantially flat upper surface 36 in opposing relation to a second, contoured lower surface 38 of the lower bale portion 34. As will be explained in extensive detail hereinbelow, the upper surface 32 of the bale member is intended to provide the cup holder assembly 10 with a support base at a first depth D1 (FIG. 1), whereas the floor portion 22 of the bin member 12 is intended to provide the cup holder assembly 10 with a support base at a second depth D2 (FIG. 3). In other words, the bin portion 12 is characterized by a first depth D1 (FIG. 1) when the bale member 30 is in the first position (FIG. 2A), and a second depth D2 (FIG. 3) when the bale member 30 is in the second position (FIG. 2B). It should be recognized that the relative orientation and individual profiles of the upper and lower bale portions 32, 34 can be individually or collectively varied without departing from the scope of the present invention.

Looking at FIGS. 1 through 3, the bale member 30 is attached, mounted, or connected to the bin member 12 in a movable manner to rotate from a first, use position (FIG. 2A) in which the substantially flat upper surface 36 is generally parallel to and distal from the bin floor portion 22, and a second, use position in which the contoured surface 38 is generally perpendicular to the bin floor portion 22 and parallel to the rear wall 20. For instance, the bale member 30—i.e., upper and lower bale portions 32, 34, is pivotably connected to the bin member 12 by, for example, screw 40 which is received by and pressed into a receiving slot 43 of pivot gear 42, fed through holes 44 defined through side walls 14, 16, and inserted into complimentary receiving slots 35 in the sides of the lower bale portion 34. Although only one screw 40 and pivot gear 42 set is shown in the drawings, the assembly 10 preferably employs two screw-gear sets to pivotably mount the bale member 30 to the bin member 12. In this regard, the two screw-gear sets are horizontally opposed along the same axis of rotation. When the bale member 30 is placed in the first position (FIG. 2A), the upper surface 36 of the bale member 30 acts as the base or primary support surface of the cup holder assembly 10. In addition, when the bale member 30 is moved to the second position (FIG. 2B), the contoured surface 38 is designed to cooperate with the front bin wall 18 to provide lateral support for at least one, but preferably two containers (not shown) therebetween.

Referring back to FIG. 1, the cup holder assembly 10 also includes a cup retention feature 50 vertically spaced from the bale member 30 along the bin rear wall 20. The cup retention feature 50 includes an upper gimbal portion 52 that is configured to mate with and attach to a complementary lower gimbal portion 54, e.g., via heat stakes. FIGS. 2A and 2B show that the upper and lower gimbals 52, 54, when attached, operatively retain (or "sandwich") first and second rubber retentions 58 and 60, respectively, therebetween. Those having ordinary skill in the art will recognize that the particular geometries and relative positioning of the first and second rubber retentions 58, 60 may be selectively varied within the scope of the claimed invention.

The cup retention feature 50—i.e., upper and lower gimbals 52, 54 and first and second rubber retentions 58 and 60, is attached, mounted, or connected to the bin member 12 in a movable manner to rotate from a first, use position (FIG. 2A), in which the cup retention feature 50 is generally parallel to the upper surface 36 of the bale member 30, and a second, stowed position, in which the cup retention feature 50 is positioned between the bale member 30 and the bin rear wall 20. By way of example, the cup retention feature 50 is pivotably connected to the bin member 12 by, for instance, screw 40 which is received by and pressed into a receiving slot 45 of a respective washer 46, fed through holes 48 defined in the side walls 14, 16 of bin member 12, and inserted into complimentary sleeves 62 protruding from opposite sides of the upper gimbal portion 52. Although only one screw 40 and washer 46 set is shown in the drawings, the assembly 10 preferably employs two screw-washer sets to pivotably mount the cup retention feature 50 to the bin member 12. In this regard, the two screw-washer sets are horizontally opposed along the same axis of rotation. When the cup retention feature 50 is placed in the use position (FIG. 2A), the first and second rubber retentions 58, 60 extend in a generally horizontal manner to cooperate with the front bin wall 18 to engage and thereby securely retain at least one, but preferably two containers therebetween. In addition, when the cup retention feature 50 is moved to the stowed position (FIG. 2B), an unobstructed path is provided through the receptacle opening 24 for utilizing the bale member contoured surface 38 and bin floor portion 22 for securely supporting containers.

A linkage member, referred to hereinafter as link 70, operatively connects the bale member 30 and cup retention feature 50 such that the bale member 30 and cup retention feature 50 selectively substantially simultaneously move, rotate, or pivot between respective positions. More specifically, the bale member 30 is connected to a lower section of the first and second bin side walls 14, 16 to rotate about a first axis A1, as shown in FIG. 2A and illustrated for explanatory purposes by arrow X. Furthermore, the cup retention feature 50 is connected to an upper section of the first and second side walls 14, 16 of bin member 12 to rotate about a second axis A2, as shown in FIG. 2A and illustrated for explanatory purposes by arrow Y. A first end 72 of the link 70 engages the bale member 30 (e.g., via protrusions 76, FIG. 3) along a third axis A3 offset a first offset distance d1 from the axis A1, as shown in FIGS. 2A and 2B. A second end 74 of the link 70 engages the cup retention feature 50 (e.g., via upper link pivot pin 78 through projections 56, FIG. 3) along a fourth axis A4 offset a second offset distance d2 from the second axis A2, as shown in FIGS. 2A and 2B. Ideally, the first offset distance d1 is greater than the second offset distance d2, creating an angular rotation ratio that allows the cup retention feature 50 to rotate faster between respective positions than the bale member 30.

The cup holder assembly 10 also includes a plurality of biasing members, defined herein as first and second torsion springs 80 and 82, respectively. The first spring (or biasing member) 80 is concentrically aligned with the axis of rotation A1 of bale member 30, positioned adjacent an inner surface of the first bin side wall 14 and nested inside of a cavity 64 (FIG. 3) formed by the lower bale portion 34. The first spring 80 engages the bale member 30 and bin member 12 to bias the bale member 30 from the first position (FIG. 2A) to the second position (FIG. 2B), and, thus, bias the cup retention feature 50 from the use position (FIG. 2A) to the stowed position (FIG. 2B) via the interconnection through link 70.

FIG. 4A provides a cross-sectional view taken along line 1-1 of FIG. 1, illustrating the bale member 30 in transition between the first and second positions, whereas FIG. 4B provides a cross-sectional view taken along line 1-1 of FIG. 1, illustrating the bale member in the second position. The bale member 30, namely assembled upper and lower bale portions 32, 34 define an arcuate channel or tunnel 84 therebetween. The arcuate channel 84 is concentric with the above mentioned first axis A1, and radially offset by the above mentioned first offset distance d1. As best seen in FIG. 4B, the arcuate channel 84 includes first and second interface portions 86 and 88, respectively, at opposing ends thereof. The protrusions 76, which extend laterally outward from the first end 72 of link 70, are slidably disposed within the arcuate channel 84 to transition between the first and second interface portions 86, 88.

According to the preferred embodiment of the present invention, the cup retention feature 50 is moved between respective use and stowed positions when the first end 72 (i.e., protrusions 76) abuts against the first interface portion 86 of channel 84. More specifically, the second spring (or biasing member) 82, as depicted in FIG. 4A, is concentrically aligned with the first axis A1 in opposing relation to first spring 80, and engaged with (e.g., pressed against and partially wrapped around) the protrusions 76 of the link 70 to bias the same into engagement with the first interface portion 86 of the arcuate channel 84. However, the first spring 80 has a first spring force constant that is greater than the second spring force constant of the second spring 82.

The link 70 and channel 84 are cooperatively configured such that the cup retention feature 50 will reach the stowed position shown in FIG. 2B—e.g., rotates approximately 90 degrees, when the bale member 30 is still transitioning between first and second positions. In other words, the cup retention feature 50, which pivots at a faster rotational velocity (due to the angular ratio described hereinabove), will complete the transition between use and stowed positions before the bale member 30 completes the transition between first and second positions. At this point, the second spring 82 will begin to compress (compare FIGS. 4A and 4B) due to the larger spring force constant of the first spring 80. As such, the channel 84, in conjunction with the link 70 and first and second biasing members 80, 82, provides a selective connection between the bale member 30 and cup retention feature 50, thereby allowing the bale member 30 to transition between respective first and second positions without being interfered with by the cup retention feature pivoting between respective use and stowed positions. In addition, the cooperation between the second spring 82 and channel 84 ensures that the bale member 30 will transition between respective first and second positions without the cup retention feature 50 traveling more than a predetermined rotational distance (i.e., that which is necessary to pivot between use and stowed positions). The second spring 82 also helps prevent the linkage member 70 from generating excessive rattling noise.

Referring again to FIG. 3, the cup holder assembly 10 also includes a push button latch assembly, indicated generally at 90. The push button latch assembly 90 is defined herein by a latch member 92 operatively engaged with a push button 94, both secured to the bin member 12 via latch assembly housing 96. The latch member 90 is operable to selectively engage— i.e., contact and press against upper surface 36, and thereby at least partially retain the bale member 30 in the first position, as seen in FIG. 2A. When the latch member 90 is disengaged from the bale member 30 (e.g., by depressing push button 92), the first biasing member 80 is then capable of urging the bale member 30 and, thus, cup retention feature 50 (via link 70) from respective first positions (FIG. 2A) to second positions (FIG. 2B).

It is also preferable that the cup holder assembly 10 include a motion damping system, indicated collectively at 100 in FIG. 3. As explained above, the pivot gear 42 is disposed concentrically with the first biasing member 80. A motion damper 102 is secured to each of the first and second bin side walls 14, 16. Each motion damper 102 is engaged with a respective pivot gear 42 such that pivoting the bale member 30 via the first biasing member 80 from the first position (FIG. 2A) to the second position (FIG. 2B) is dampened by the motion damper 102.

While the best modes for carrying out the present invention have been described in detail, those familiar with the art to which this invention relates will recognize various alternative designs and embodiments for practicing the invention within the scope of the appended claims.

The invention claimed is:

1. A cup holder assembly, comprising:
   a bin member having at least one generally vertical wall portion with a floor portion extending from one end thereof;
   a bale member having first and second opposing surfaces, said bale member being movable between a first position in which said first surface is generally parallel to said floor portion, and a second position in which said second surface is generally perpendicular to said floor portion;
   wherein said bin member is characterized by a first depth when said bale member is in said first position and a second depth when said bale member is in said second position;
   a cup retention feature spaced from said bale member, said cup retention feature being movable between a use position in which said cup retention feature is configured to engage a container, and a stowed position; and
   an actuation member configured to substantially simultaneously move said bale member between said first and second positions and said cup retention feature between said use and stowed positions.

2. The cup holder assembly of claim 1, wherein said actuation member includes a linkage member operatively connected to said bale member and said cup retention feature.

3. The cup holder assembly of claim 2, wherein said actuation mechanism further includes a first biasing member operatively engaged with said bale member to bias the same from said first position to said second position.

4. The cup holder assembly of claim 3, wherein said bale member is operatively connected to said bin member to rotate about a first axis, and said cup retention feature is operatively connected to said bin member to rotate about a second axis.

5. The cup holder assembly of claim 4, wherein a first end of said linkage member engages said bale member along a third axis offset a first distance from said first axis, and a second end of said linkage member engages said cup retention feature along a fourth axis offset a second distance from said second axis.

6. The cup holder assembly of claim 5, wherein said first offset distance is greater than said second offset distance.

7. The cup holder assembly of claim 6, wherein said bale member defines an arcuate channel with first and second interface portions at opposing ends thereof, said first end of said linkage member slidably disposed within said arcuate channel such that said cup retention feature moves between said use and stowed positions when said first end abuts against said first interface portion.

8. The cup holder assembly of claim 7, further comprising:
   a second biasing member operatively engaged with said first end of said linkage member to bias the same into engagement with said first interface portion of said arcuate channel.

9. The cup holder assembly of claim 8, wherein said first biasing member has a first spring force constant, and said second biasing member has a second spring force constant that is less than said first spring force constant.

10. The cup holder assembly of claim 9, further comprising:
    a latch member operable to selectively engage and thereby at least partially retain said bale member in said first position;
    wherein said first biasing member urges said bale member from said first position to said second position when said latch member is disengaged therefrom.

11. The cup holder assembly of claim 10, further comprising:
    a gear member disposed concentrically with said first biasing member; and
    a motion damper engaged with said gear member;
    wherein pivoting of said bale member via said first biasing member from said first position to said second position is dampened by said motion damper.

12. A dual-depth cup holder assembly, comprising:
    a bin member having at least one generally vertical wall portion with a floor portion extending generally perpendicularly from one end thereof;
    a bale member having a substantially flat surface opposing a contoured surface, said bale member being pivotable with respect to said bin member between a first position in which said substantially flat surface is generally parallel to and distal from said floor portion, and a second position in which said contoured surface is generally perpendicular to said floor portion;
    a cup retention feature spaced from said bale member along said at least one wall portion, said cup retention feature being pivotable with respect to said bin member between a use position in which said cup retention feature is configured to engage with and thereby retain a container, and a stowed position in which said cup retention feature is positioned between said bale member and said wall portion; and a linkage member operatively connecting said bale member and said cup retention feature such that pivoting of said bale member between said first and second positions substantially simultaneously pivots said cup retention feature between said use and stowed positions;

wherein said bin member is characterized by a first depth when said bale member is in said first position and a second depth when said bale member is in said second position.

13. The cup holder assembly of claim 12, wherein said bale member is operatively connected to said bin member to rotate about a first axis, and said cup retention feature is operatively connected to said bin member to rotate about a second axis; and wherein a first end of said linkage member engages said bale member along a third axis offset a first distance from said first axis, and a second end of said linkage member engages said cup retention feature along a fourth axis offset a second distance from said second axis, said first offset distance being greater than said second offset distance.

14. The cup holder assembly of claim 13, further comprising:

a first spring member operatively engaged with said bale member to bias the same from said first position to said second position and said cup retention feature from said use position to said stowed position.

15. The cup holder assembly of claim 14, wherein said bale member defines an arcuate channel with first and second interface portions at opposing ends thereof, said first end of said linkage member having at least one protrusion slidably disposed within said arcuate channel such that said cup retention feature moves between said use and stowed positions when said at least one protrusion abuts against said first interface portion.

16. The cup holder assembly of claim 15, further comprising:

a second spring member operatively engaged with said first end of said linkage member to bias the same into engagement with said first interface portion of said arcuate channel, said first spring member having a first spring force constant and said second spring member having a second spring force constant that is less than said first spring force constant.

17. The cup holder assembly of claim 16, further comprising:

a latch member operable to selectively engage and thereby at least partially retain said bale member in said first position;

wherein said first spring member pivots said bale member from said first position to said second position when said latch member is disengaged therefrom.

18. The cup holder assembly of claim 17, further comprising:

a gear member disposed concentrically with said first spring member; and a motion damper engaged with said gear member;

wherein pivoting of said bale member via said first spring member from said first position to said second position is dampened by said motion damper.

19. A dual-depth cup holder assembly for use in a passenger compartment of a motorized vehicle, comprising:

a bin member having at least one generally vertical wall portion with a first floor portion extending generally perpendicularly from one end thereof;

a bale member having a substantially flat surface opposing a contoured surface, said bale member being pivotable with respect to said bin member between a first position in which said substantially flat surface is generally parallel to and distal from said floor portion, and a second position in which said contoured surface is generally perpendicular to said floor portion;

a cup retention feature vertically spaced from said bale member along said at least one wall portion, said cup retention feature being pivotable with respect to said bin member between a use position in which said cup retention feature is configured to securely retain a container, and a stowed position in which said cup retention feature is positioned between said bale member and said at least one wall portion;

a linkage member operatively connecting said bale member and said cup retention feature such that pivoting said bale member between said first and second positions selectively substantially simultaneously pivots said cup retention feature between said use and stowed positions; and a spring member operatively engaged with said bale member to bias the same from said first position to said second position and said cup retention feature from said use to said stowed positions;

wherein said bale member is operatively connected to said bin member to rotate about a first axis, and said cup retention feature is operatively connected to said bin member to rotate about a second axis; and wherein a first end of said linkage member engages said bale member along a third axis offset a first distance from said first axis, and a second end of said linkage member engages said cup retention feature along a fourth axis offset a second distance from said second axis, said first offset distance being greater than said second offset distance.

* * * * *